US012510490B2

(12) United States Patent
Yachida et al.

(10) Patent No.: US 12,510,490 B2
(45) Date of Patent: Dec. 30, 2025

(54) INSPECTION APPARATUS FOR INSPECTING A CONTAINER

(71) Applicant: NEC Corporation, Tokyo (JP)

(72) Inventors: Shoji Yachida, Tokyo (JP); Michiaki Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 113 days.

(21) Appl. No.: 18/288,103

(22) PCT Filed: May 12, 2021

(86) PCT No.: PCT/JP2021/018094
§ 371 (c)(1),
(2) Date: Oct. 24, 2023

(87) PCT Pub. No.: WO2022/239158
PCT Pub. Date: Nov. 17, 2022

(65) Prior Publication Data
US 2024/0201102 A1 Jun. 20, 2024

(51) Int. Cl.
*G01N 21/90* (2006.01)
*G01N 21/88* (2006.01)

(52) U.S. Cl.
CPC .......... *G01N 21/90* (2013.01); *G01N 21/8806* (2013.01); *G01N 2021/8841* (2013.01)

(58) Field of Classification Search
CPC ............... G01N 21/90; G01N 21/8806; G01N 2021/8841; G01N 21/9027; G01N 21/909
USPC ...................................................... 356/240.1
See application file for complete search history.

(56) References Cited

U.S. PATENT DOCUMENTS

2023/0108490 A1\* 4/2023 Numata ............. G01N 21/3581
356/237.1

FOREIGN PATENT DOCUMENTS

| JP | S53-125057 A | 11/1978 |
| JP | 2003-315280 A | 11/2003 |
| JP | 2004-279218 A | 10/2004 |
| JP | 2010-210315 A | 9/2010 |
| JP | 2013-096921 A | 5/2013 |
| JP | 2018-072180 A | 5/2018 |
| JP | 2019-028016 A | 2/2019 |
| JP | 2019-517668 A | 6/2019 |
| JP | 2019-215376 A | 12/2019 |
| JP | 2020-118458 A | 8/2020 |

(Continued)

OTHER PUBLICATIONS

A machine translation of JP2010210315 (Year: 2010).\*

(Continued)

*Primary Examiner* — Seung C Sohn
(74) *Attorney, Agent, or Firm* — Sughrue Mion, PLLC

(57) ABSTRACT

An inspection apparatus has: a gripping unit that grips a container filled with a liquid; a first lighting unit that emits light onto the liquid from one longitudinal end side of the container; and a second lighting unit that emits light onto the liquid from the other longitudinal end side of the container. The first lighting unit and the second lighting unit are arranged on a same side as an imaging device that acquires image data showing a state of the liquid as seen from the container, and are each installed so as to emit light onto the liquid from a position where a center axis passing through a center of the container is tilted by any angle of 0 degrees or more and 40 degrees or less.

9 Claims, 8 Drawing Sheets

(56) References Cited

FOREIGN PATENT DOCUMENTS

JP    2020-139749 A    9/2020
WO    2016/208622 A1    12/2016

OTHER PUBLICATIONS

A machine translation of KR20110115078 (Year: 2011).*
International Search Report for PCT Application No. PCT/JP2021/018094, mailed on Jul. 20, 2021.
JP Official Communication for JP Application No. 2023-520659, mailed on Nov. 25, 2025 with English Translation.

* cited by examiner

INSPECTION APPARATUS FOR INSPECTING A CONTAINER

This application is a National Stage Entry of PCT/JP2021/018094 filed on May 12, 2021, the contents of all of which are incorporated herein by reference, in their entirety.

TECHNICAL FIELD

The present invention relates to an inspection apparatus and an inspection method.

BACKGROUND ART

Techniques for detecting foreign objects present in liquids in containers are known.

For example, Patent Literature 1 describes a foreign object detection system that holds a container so as to be able to rotate around a first axis different from the center axis of the container and a second axis orthogonal to the first axis. Moreover, according to Patent Literature 1, an illumination light source is placed opposite a camera that is an imaging device across the container. According to such a configuration, the imaging device acquires image data in a state where light is emitted onto the imaging device through the container.

CITATION LIST

Patent Literature

Patent Literature 1: Japanese Unexamined Patent Application Publication No. JP-A 2020-118458

SUMMARY OF INVENTION

Technical Problem

As described in Patent Literature 1, in a case where the illumination light source is placed opposite the camera that is the imaging device across the container, a target object, such as a scratch formed on the container, a foreign object like a glass fragment that transmits light, and a long thin foreign substance like a fiber fragment, may not block light from the illumination light source well, for example, by transmitting the light. As a result, there is a case where it is difficult to detect a foreign object and the like. Thus, there is a problem that it may be difficult to detect a foreign object based on acquired image data.

Accordingly, an object of the present invention is to provide an inspection apparatus and an inspection method that can solve the problem that it may be difficult to detect a foreign object based on acquired image data.

Solution to Problem

In order to achieve the object, an inspection apparatus as an aspect of the present disclosure includes: a gripping unit that grips a container filled with a liquid; a first lighting unit that emits light onto the liquid from one longitudinal end side of the container; and a second lighting unit that emits light onto the liquid from an other longitudinal end side of the container. The first lighting unit and the second lighting unit are arranged on a same side as an imaging device that acquires image data showing a state of the liquid as seen from the container, and are each installed so as to emit light onto the liquid from a position where a center axis passing through a center of the container is tilted by any angle of 0 degrees or more and 40 degrees or less.

Further, an inspection method as another aspect of the present disclosure is executed by an inspection apparatus. The inspection method includes: from a position which is, as seen from a container filled with a liquid, on a same side as an imaging device that acquires image data showing a state of the liquid and in which a center axis passing through a center of the container is tilted by any angle of 0 degrees or more and 40 degrees or less, emitting light onto the liquid; and acquiring image data showing a state of the liquid during light emission.

Advantageous Effects of Invention

According to the configurations as described above, it is possible to provide an inspection apparatus and an inspection method that enable acquisition of image data for accurately detecting a foreign object.

DESCRIPTION OF EXAMPLE EMBODIMENTS

First Example Embodiment

Figure 1:
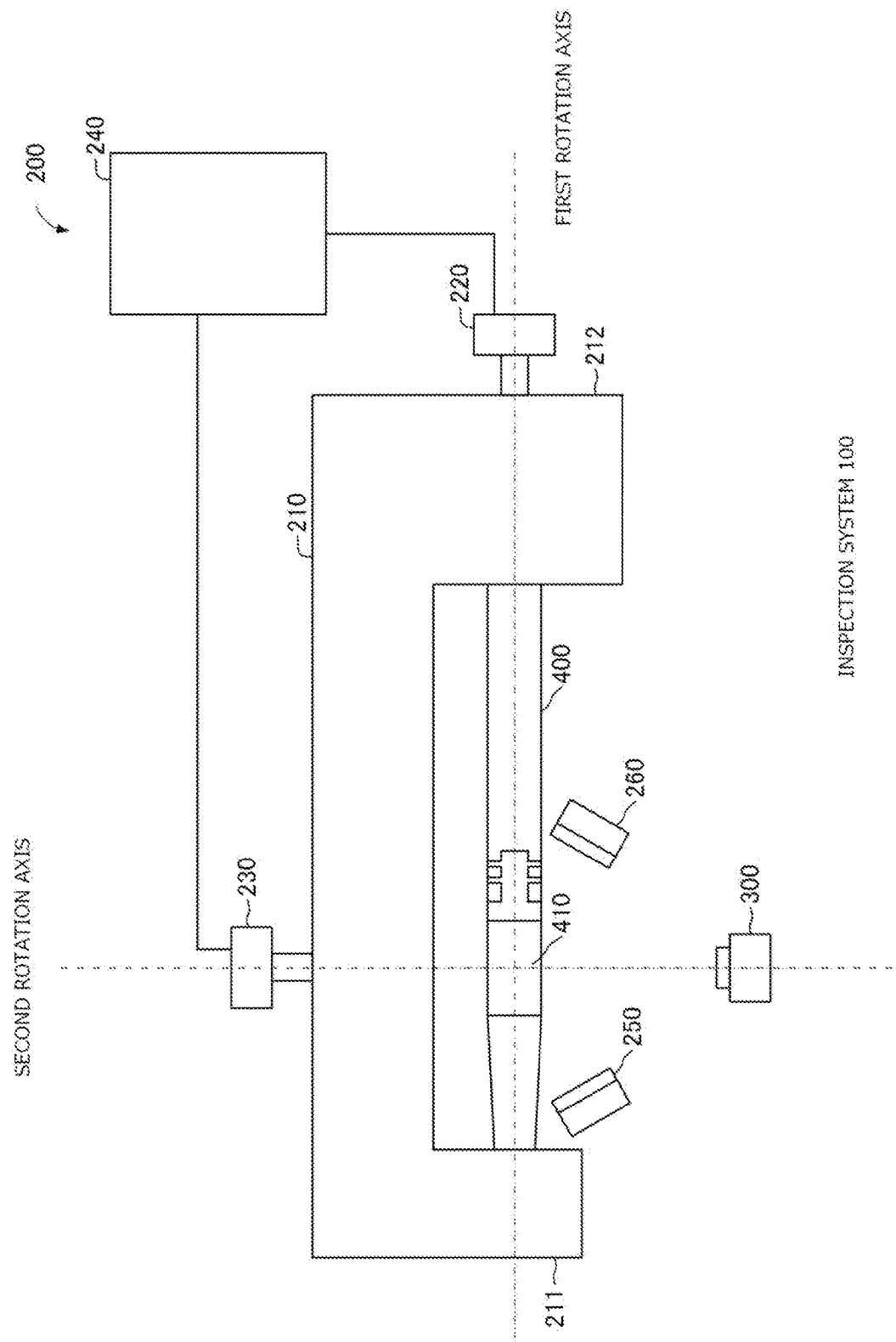
FIG. 1 is a plan view showing an example of a configuration of an inspection system in a first example embodiment of the present disclosure.
Figure 2:
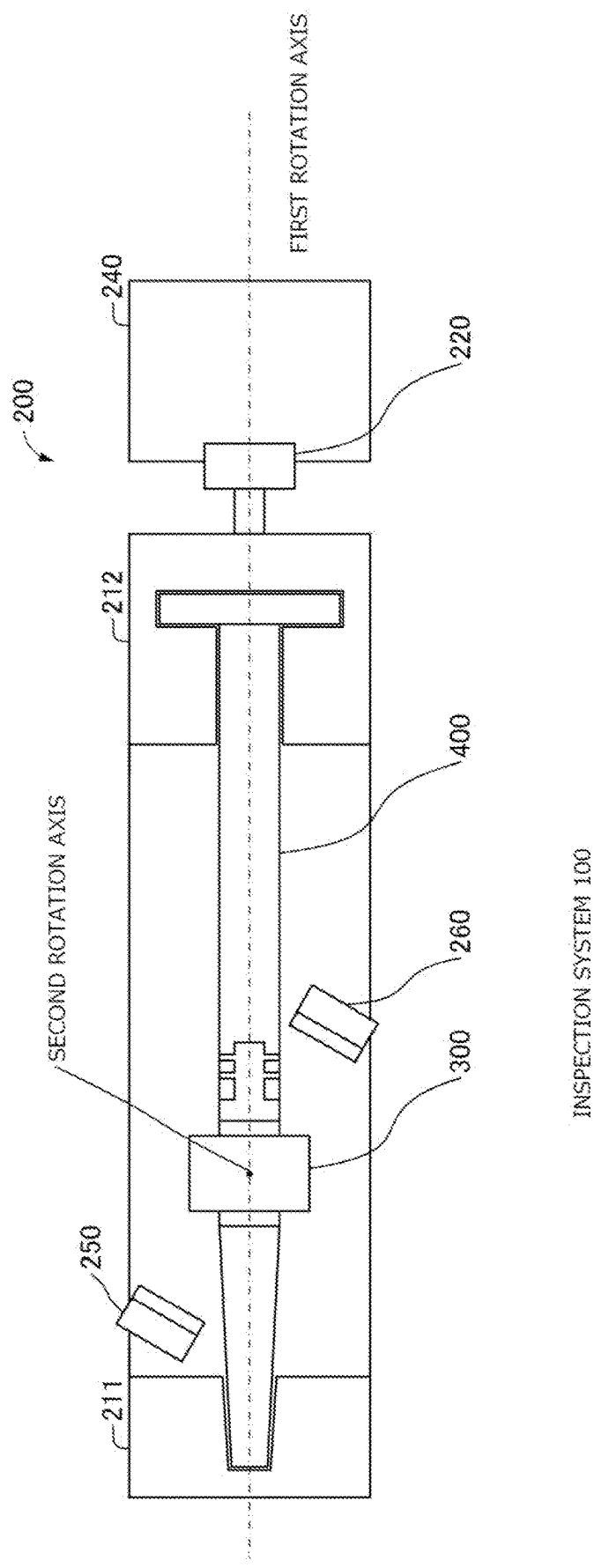
FIG. 2 is a front view showing the example of the configuration of the inspection system.
Figure 3:
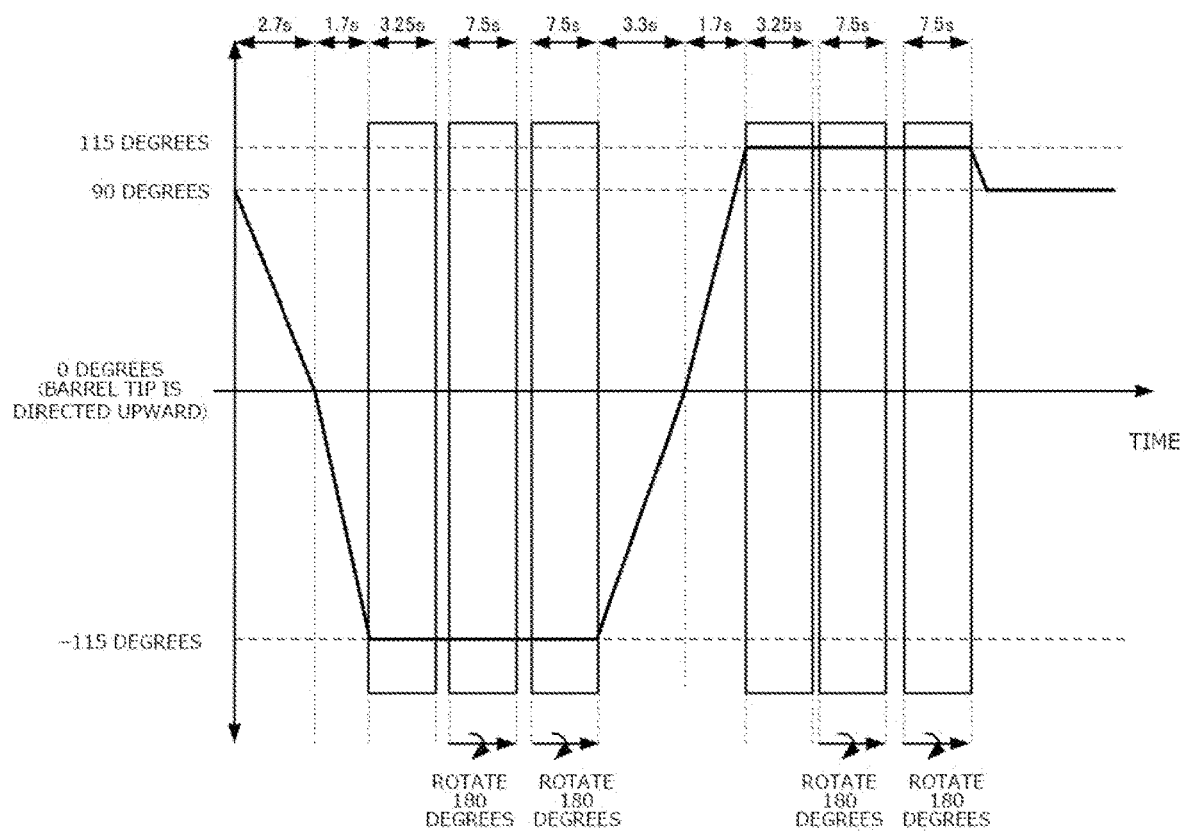
FIG. 3 is a view showing an example of control by a control device.
Figure 4:
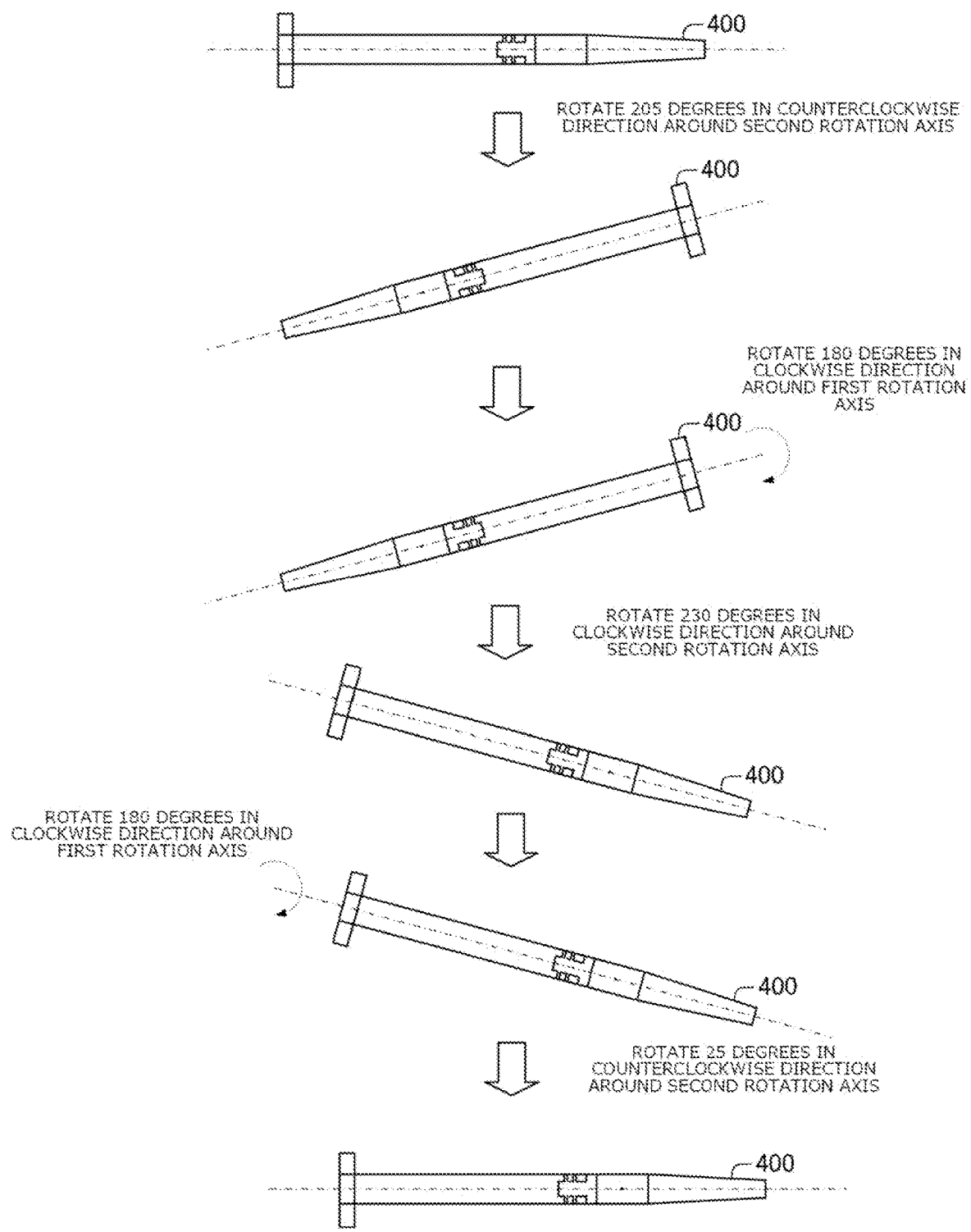
FIG. 4 is a view showing the example of the control by the control device.
Figure 5:
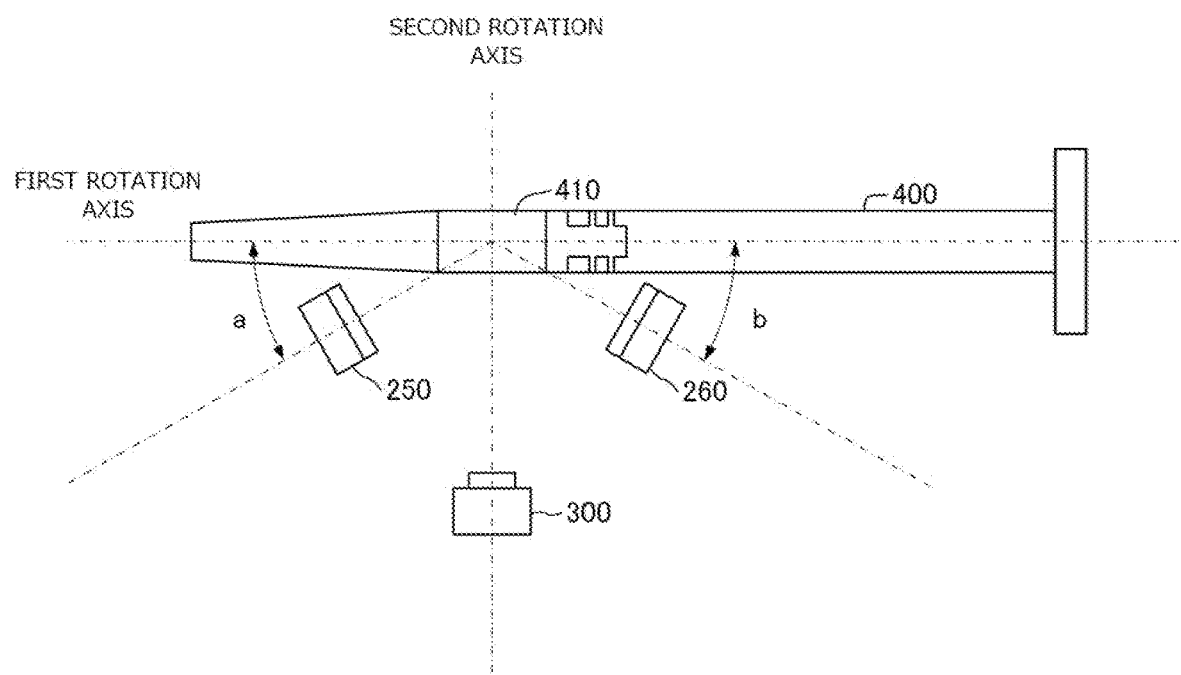
FIG. 5 is a view for describing an example of arrangement of a first lighting unit and a second lighting unit.
Figure 6:
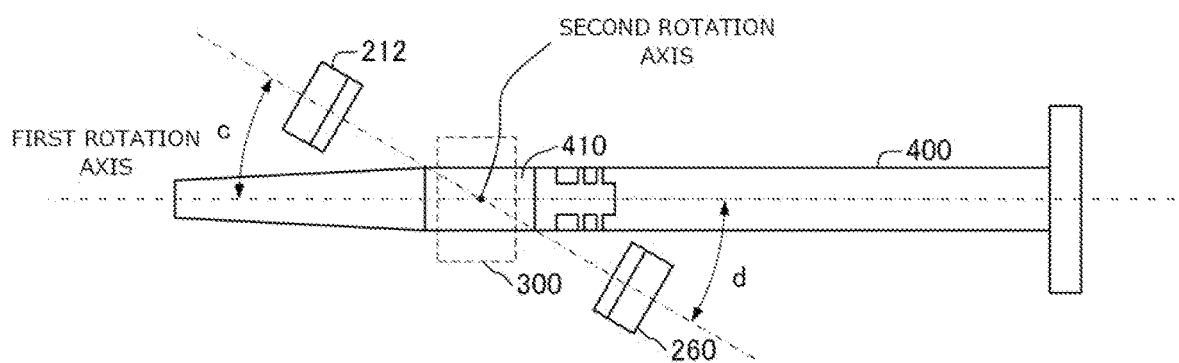
FIG. 6 is a view for describing the example of the arrangement of the first lighting unit and the second lighting unit.
Figure 7:
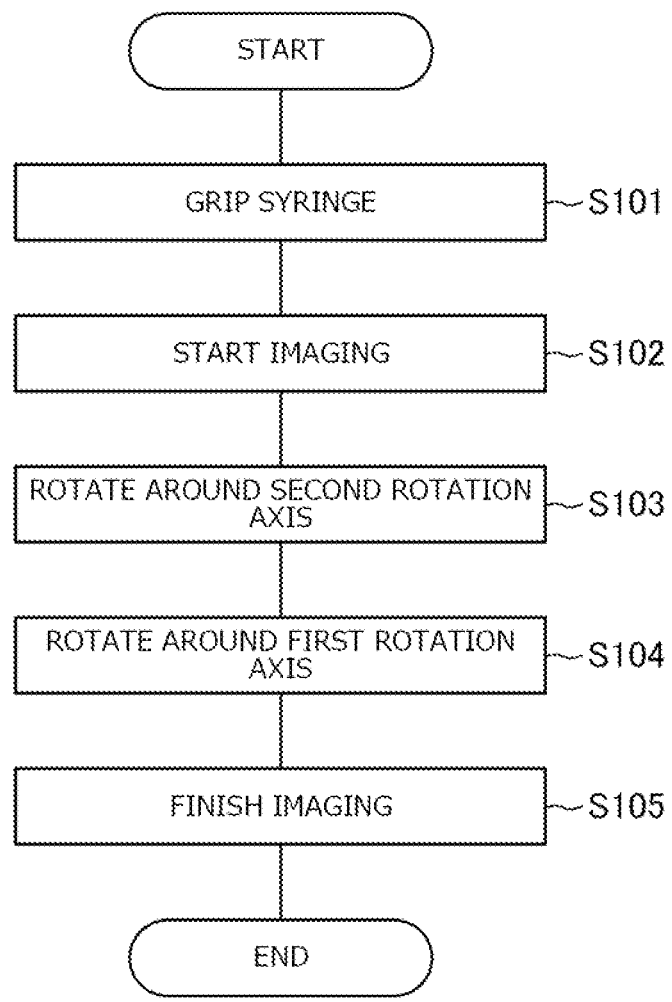
FIG. 7 is a flowchart showing an example of operation of the inspection system.

A first example embodiment of the present disclosure will be described with reference to FIGS. 1 to 7. FIG. 1 is a plan view showing an example of a configuration of an inspection system 100. FIG. 2 is a front view showing the example of the configuration of the inspection system 100. FIGS. 3 and 4 are views showing an example of control by a control device 240. FIGS. 5 and 6 are views for describing an example of arrangement of a first lighting unit 250 and a second lighting unit 260. FIG. 7 is a flowchart showing an example of operation of the inspection system 100.

In the first example embodiment of the present disclosure, an inspection system 100 will be described that acquires image data usable in detecting a foreign object contained in a container 400 filled with a liquid 410 such as water and medicine. As will be described later, in the inspection system 100, the first lighting unit 250 and the second lighting unit 260 are arranged on the same side as a side where the camera 300 is installed as seen from the container 400. Specifically, the inspection system 100 has the first lighting unit 250 on the same side as the side where the camera 300 is installed as seen from the container 400 and on the side of one longitudinal end of the container 400. Moreover, the inspection system 100 has the second lighting unit 260 on the same side as a position where the camera 300 is installed as seen from the container 400 and on the side of the other longitudinal end of the container 400. Thus, the inspection system 100 has the first lighting unit 250 that emits light onto the liquid 410 from the side of the one longitudinal end of the container 400, and the second lighting unit 260 that emits light onto the liquid 410 from the side of the other longitudinal end of the container 400. Thus, in the case of the inspection system 100 in this example embodiment, the first lighting unit 250 and the second lighting unit 260 are arranged so that the camera 300 can acquire light reflected by a foreign object and the like.

In this example embodiment, a case of using a syringe as the container 400 will be described. For example, in a case where the viscosity of the liquid 410 filled inside can be evaluated as high such as a predetermined value or more, use of a syringe as the container 400 to fill the liquid 410 inside is assumed. The container 400 may be another container that transmits light, such as a glass bottle and a plastic bottle.

FIG. 1 is a plan view showing an example of a configuration of the inspection system 100. Moreover, FIG. 2 is a front view showing the example of the configuration of the inspection system 100. Referring to FIGS. 1 and 2, the inspection system 100 includes, for example, an inspection apparatus 200 and a camera 300 that is an imaging device.

The inspection apparatus 200 is an apparatus that rotates the container 400 while gripping a barrel tip side that is one end of the container 400 filled with liquid 410 and a plunger side that is the other end. For example, the inspection apparatus 200 can rotate the container 400 being gripped around a first rotation axis that is a center axis passing through the center of the container 400 in the longitudinal direction. Moreover, the inspection apparatus 200 can rotate the container 400 being gripped around a second rotation axis that is a perpendicular axis orthogonal to the first rotation axis. Thus, the inspection apparatus 200 has a biaxial rotation means.

Referring to FIGS. 1 and 2, the inspection apparatus 200 has a gripping device 210, a first motor 220, a second motor 230, a control device 240, the first lighting unit 250, and the second lighting unit 260.

The gripping device 210 grips the container 400 and rotates it around the second rotation axis in response to the rotation of the second motor 230 functioning as a rotating means. For example, the gripping device 210 has a structure such that a first gripping part 211 and a second gripping part 212 provided vertically from the ends of a plate-like flat plate part are combined via the flat plate part. In this example embodiment, there is no specific limitation on a material forming the gripping device 210. For example, the gripping device 210 may be formed of any material such as resin and metal. Also, the gripping device 210 may have any shape. For example, the flat plate part forming the gripping device 210 may have a rectangular shape in front view as shown in FIG. 2, or may have a circular shape in front view.

The first gripping part 211 grips one longitudinal end of the container 400, for example, the barrel tip side of the container 400. For example, the first gripping part 211 includes a first pedestal part that rotates about the first rotation axis in response to the rotation of the gripped container 400, and grips the container 400 in a state where the first pedestal part is in contact with the container 400. In other words, the first gripping part 211 grips the container 400 so as to be able to rotate the container 400 around the first rotation axis.

The second gripping part 212 grips the other longitudinal end of the container 400, for example, the plunger side of the container 400. For example, the second gripping part 212 includes a second pedestal part that rotates about the first rotation axis in response to the rotation of the first motor 220, and grips the container 400 in a state where the second pedestal part is in contact with the container 400. In other words, the second gripping part 212 grips the container 400 so as to be able to rotate the container 400 around the first rotation axis.

It is desirable for the first gripping part 211 and the second gripping part 212 to grip the container 400 so that the first rotation axis passes through the center of the container 400 in side view. In other words, it is desirable for the first gripping part 211 and the second gripping part 212 to be configured to grip the container 400 so that the center of the container 400 overlaps the first rotation axis when viewed from the side. This may be realized by, for example, forming the first pedestal part and the second pedestal part so that the first rotation axis passes through the center of the first pedestal part and the center of the second pedestal part.

Further, it is desirable for the first gripping part 211 and the second gripping part 212 to, for example, grip the container 400 so that the second rotation axis passes through the center of the liquid 410 filled in the container 400 in the longitudinal direction of the container 400. For example, the first gripping part 211 and the second gripping part 212 may be configured to be able to adjust the lengths thereof in the longitudinal direction of the container 400. By configuring the first gripping part 211 and the second gripping part 212 to be able to adjust the lengths thereof in the longitudinal direction, various sizes of containers 400 can be gripped, and position adjustment in gripping the container 400 is facilitated. The length adjustment function may be realized using a known means, for example, by composing each of the first gripping part 211 and the second gripping part 212 by first and second portions, and making the first and second portions slidable and also making them fixable at any position.

For example, as described above, it is desirable for the first gripping part 211 and the second gripping part 212 to be formed so as to be able to grip the container 400 at positions corresponding to the first rotation axis and the second rotation axis. Meanwhile, the first gripping part 211 and the second gripping part 212 may grip the container 400 at positions other than those illustrated.

Further, the gripping device 210 is connected to the second motor 230 rotating about the second rotation axis at the flat plate part combining the first gripping part 211 and the second gripping part 212. Consequently, the gripping device 210 rotates about the second rotation axis orthogonal to the first rotation axis in response to the rotation of the second motor 230. As a result, the container 400 gripped by the gripping device 210 also rotates about the second rotation axis in response to the rotation of the second motor 230.

The first motor 220 rotates itself with electric power supplied from the outside, and thereby rotates the container 400 gripped by the first gripping part 211 and the second gripping part 212 around the first rotation axis. As will be described later, the first motor 220 is connected to the control device 240, and rotates the container 400 in response to an instruction from the control device 240.

The second motor 230 rotates itself with electric power supplied from the outside, and thereby rotates the container 400 gripped by the first gripping part 211 and the second gripping part 212 in a state where the gripping device is tilted, around the second rotation axis orthogonal to the first rotation axis. As will be described later, the second motor 220 is connected to the control device 240, and rotates the container 400 in response to an instruction from the control device 240.

The control device 240 is an information processing device 240 that controls the rotation of the first motor 220 and the second motor 230. For example, the control device 240 has an arithmetic logit unit such as a CPU (Central Processing Unit) and a memory unit, and controls the rotation of the first motor 220 and the second motor 230 by execution of a program stored in the memory unit by the arithmetic logic unit. In other words, for example, the control device 240 gives a predetermined instruction to the first motor 220 and the second motor 230 so as to realize rotation control along a predetermined program in response to a start instruction from an external device or the like connected to the control device 240, a start instruction input into the control device 240, and the like.

For example, the control device 240 controls the second motor 230 to rotate about the second rotation axis, and thereafter controls the first motor 220 to rotate about the first rotation axis. Moreover, after the abovementioned control, the control device 240 can further control the second motor 230 to rotate about the second rotation axis, and thereafter control the first motor to rotate about the first rotation axis. Thus, the control device 240 can instruct the first motor 220 and the second motor 230 to rotate about the second rotation axis and thereafter rotate about the first rotation axis.

FIGS. 3 and 4 show a specific example of the control by the control device 240. Referring to FIGS. 3 and 4, for example, the control device 240 starts predetermined rotation control from a state where the container 400 is level with the ground to be a reference surface. In other words, the control device 240 starts predetermined rotation control from an initial state, which is a state where the barrel tip of the container 400 is tilted 90 degrees clockwise from a 0-degree state where the barrel tip is directed upward.

Referring to FIGS. 3 and 4, first, the control device 240 controls the second motor 230 so that the container 400 rotates 205 degrees in the counterclockwise direction about the second rotation axis. At this time, the control device 240 can change a rotation speed until the barrel tip of the container 400 is directed upward (that is, until the tilt of the container 400 becomes 0 degrees) and after the barrel tip of the container 400 is directed upward. For example, the control device 240 controls the rotation so that the rotation speed before the barrel tip of the container 400 is directed upward (that is, before the tilt of the container 400 becomes 0 degrees) becomes slower than after the barrel tip of the container 400 is directed upward. Specifically, for example, the control device 240 rotates the container 400 for 2.7 seconds until the barrel tip of the container 400 is directed upward, and then rotates the container 400 for 1.7 seconds for the remaining 115 degrees.

After that, the control device 240 controls the first motor 220 so that the container 400 rotates 180 degrees in the clockwise direction about the first rotation axis. That is to say, the control device 240 rotates the container 400 around the first rotation axis in a state where the barrel tip side of the container 400 is located lower than the plunger side as shown in FIG. 4. At this time, the control device 240 can rotate the container 400 a plurality of times at a predetermined interval. For example, in the case of FIGS. 3 and 4, the control device 240 rotates the container 400 180 degrees two times for 7.5 seconds per time.

Further, after the abovementioned rotation, the control device 240 controls the second motor 230 so that the container 400 rotates 230 degrees in the clockwise direction about the second rotation axis. At this time, the control device 240 can change the rotation speed before the barrel tip of the container 400 is directed upward (that is, before the tilt of the container 400 becomes 0 degrees) and after the barrel tip of the container 400 is directed upward. For example, the control device 240 controls the rotation so that the rotation speed before the barrel tip of the container 400 is directed upward (that is, before the tilt of the container 400 becomes 0 degrees) becomes slower than the rotation speed after the barrel tip of the container 400 is directed upward. Specifically, for example, the control device 240 controls to rotate the container 400 for 3.3 seconds until the barrel tip of the container 400 is directed upward, and then controls to rotate the container 400 for 1.7 seconds for the remaining 115 degrees.

After that, the control device 240 controls the first motor 220 so that the container 400 rotates 180 degrees in the clockwise direction about the first rotation axis. That is to say, the control device 240 rotates the container 400 around the first rotation axis in a state where the barrel tip side of the container 400 is located lower than the plunger side as shown in FIG. 4. At this time, the control device 240 can rotate the container 400 a plurality of times. For example, in the case of FIGS. 3 and 4, the control device 240 rotates the container 400 180 degrees two times for 7.5 seconds per time.

After that, the control device 240 rotates the container 400 25 degrees in the counterclockwise direction around the second rotation axis. Consequently, the container 400 returns to the initial state where the container 400 is level with the ground that is the reference surface.

Thus, the control device 240 can give a necessary instruction to the first motor 220 and the second motor 230 to rotate around the second rotation axis and thereafter rotate around the first rotation axis. Meanwhile, the control method executed by the control device 240 is not limited to the abovementioned case. For example, the angle that the control device 240 rotates the container 400 around the second rotation axis and the angle that the control device 240 rotates the container 400 around the first rotation axis may be other than those illustrated in FIGS. 3 and 4. Moreover, the speed that the control device 240 rotates the container 400 may be other than illustrated above.

The control device 240 may control the first motor 220 and the second motor 230 to rotate about the first rotation axis after waiting for a predetermined time after the rotation around the second rotation axis, or may control the first motor 220 and the second motor 230 to rotate around the first rotation axis without waiting after the rotation around the second rotation axis.

Further, the control device 240 may be configured to vary rotation control in accordance with, for example, the viscosity of the liquid 410 filled in the container 400. For example, the control device 240 may be configured to, when it is possible to evaluate that the liquid 410 with high viscosity is filled, such as when the viscosity of the liquid 410 is expected to be higher than a predetermined value, rotate at a higher speed (may be any speed) than a predetermined value around the first rotation axis and then rotate around the second rotation axis. Thus, by rotating around the first rotation axis and then rotating around the second rotation axis when the viscosity of the liquid 410 is expected to be high, it is possible to give sufficient rotation to the liquid 410 even when the viscosity of the liquid 410 is high.

Consequently, it becomes possible to acquire more appropriate image data for detecting a foreign object and the like in the liquid 410. Whether or not the viscosity of the liquid 410 is high may be determined, for example, in accordance with a component contained in the liquid 410 (for example, the size of protein).

The first lighting unit 250 emits light onto the liquid 410 filled in the container 400 from the side of one longitudinal end of the container 400, for example, from the side of the barrel tip of the container 400. For example, the first lighting unit 250 has a rectangular shape, a circular shape, or the like, and is capable of surface light emission. For example, the first lighting unit 250 is installed at a predetermined position independently of the gripping device 210 and so forth using an illumination fixing means or the like, which is not shown. For example, as described above, the first lighting unit 250 is installed on the same side as the side where the camera 300 is installed as seen from the container 400. In other words, the first lighting unit 250 is installed on the opposite side from the side where the flat plate part of the gripping device 210 and the second motor 230 are located as seen from the container 400. According to such a configuration, the camera 300 to be described later captures reflected light of the light emitted by the first lighting unit 250. In other words, it can be said that the first lighting unit 250 is installed so that the reflected light enters the camera 300.

The second lighting unit 260 emits light onto the liquid 410 filled in the container 400 from the side of the other longitudinal end of the container 400, for example, from the side of the plunger of the container 400. For example, the second lighting unit 260 has a rectangular shape, a circular shape, or the like, and is capable of surface light emission. For example, the second lighting unit 260 is installed at a predetermined position independently of the gripping device 210, the first lighting unit 250 and so forth using an illumination fixing means or the like, which is not shown. For example, as described above, the second lighting unit 260 is installed on the same side as the side where the camera 300 is installed as seen from the container 400. In other words, the second lighting unit 260 is installed on the opposite side from the side where the flat plate part of the gripping device 210 and the second motor 230 are located as seen from the container 400. According to such a configuration, the camera 300 to be described later captures reflected light of the light emitted by the second lighting unit 260. In other words, it can be said that the second lighting unit 260 is installed so that the reflected light enters the camera 300.

FIGS. 5 and 6 are views for specifically describing the positional relation between the first lighting unit 250 and the second lighting unit 260. Specifically, FIG. 5 shows an example of the positional relation between the first lighting unit 250, the second lighting unit 260, and the container 400 when viewed from the plane direction. Moreover, FIG. 6 shows an example of the positional relation between the first lighting unit 250, the second lighting unit 260, and the container 400 when viewed from the front direction.

Referring to FIG. 5, the first lighting unit 250 and the second lighting unit 260 are opposed to each other at a predetermined angle across the second rotation axis when viewed from the plane direction. For example, the first lighting unit 250 is installed closer to the barrel tip than the second rotation axis, and the second lighting unit 260 is installed closer to the plunger than the second rotation axis. Moreover, the first lighting unit 250 is installed so as to emit light onto the liquid 410 from a position closer to the camera 300 by a degrees from the first rotation axis when viewed from the plane direction. On the other hand, the second lighting unit 260 is installed so as to emit light onto the liquid 410 from a position closer to the camera 300 by b degrees from the first rotation axis when viewed from the plane direction. In other words, the first lighting unit 250 is installed so as to emit light onto the liquid 410 from a position where the first rotation axis is tilted by a degrees in the horizontal direction, and the second lighting unit 260 is installed so as to emit light onto the liquid 410 from a position where the first rotation axis is tilted by b degrees in the horizontal direction.

Thus, the first lighting unit 250 and the second lighting unit 260 are arranged so as to emit light onto the liquid 410 from positions closer to the camera 300 by predetermined angles than the first rotation axis when viewed from the plane direction. Herein, the angle of a degrees is any value of 10 degrees or more and 30 degrees or less. Moreover, the angle of b degrees is any value of 10 degrees or more and 30 degrees or less. The values of a and b may be the same or may be different. Moreover, FIG. 5 shows an example in which the intersection of the first rotation axis and the second rotation axis overlaps the optical axes of the first lighting unit 250 and the second lighting unit 260. However, the intersection of the first rotation axis and the second rotation axis does not necessarily need to overlap the optical axes of the first lighting unit 250 and the second lighting unit 260.

Further, referring to FIG. 6, the first lighting unit 250 and the second lighting unit 260 are opposed to each other at a predetermined angle across the first rotation axis when viewed from the front direction. For example, the first lighting unit 250 is installed above the first rotation axis, and the second lighting unit 260 is installed below the first rotation axis. Moreover, the first lighting unit 250 is installed so as to emit light onto the liquid 410 from a position c degrees above the first rotation axis when viewed from the front direction. On the other hand, the second lighting unit 260 is installed so as to emit light onto the liquid 410 from a position d degrees below the first rotation axis when viewed from the front direction. In other words, the first lighting unit 250 is installed so as to emit light onto the liquid 410 from a position where the first rotation axis is tilted by c degrees in the vertical direction, and the second lighting unit 260 is installed so as to emit light onto the liquid 410 from a position where the first rotation axis is tilted by d degrees in the vertical direction.

Thus, the first lighting unit 250 and the second lighting unit 260 are arranged so as to emit light onto the liquid 410 from above or below the first rotation axis by predetermined angles when viewed from the front direction. Herein, the angle of c degrees is any value of 0 degrees or more and 40 degrees or less, and is desirable to be any value of 10 degrees or more and 30 degrees or less. Moreover, the angle of d degrees is any value of 0 degrees or more and 40 degrees or less, and is desirable to be any value of 10 degrees or more and 30 degrees or less. The values of c and d may be the same or may be different. Moreover, FIG. 6 shows an example in which the intersection of the first rotation axis and the second rotation axis overlaps the optical axes of the first lighting unit 250 and the second lighting unit 260. However, the intersection of the first rotation axis and the second rotation axis does not necessarily need to overlap the optical axes of the first lighting unit 250 and the second lighting unit 260.

In the case illustrated in FIG. 6, it can be said that the first lighting unit 250 and the second lighting unit 260 are arranged so as to have a point-symmetric positional relation about a point through which the second rotation axis passes when viewed from the front. Thus, the first lighting unit 250 and the second lighting unit 260 may be arranged so as to have a point-symmetric positional relation about a point through which the second rotation axis passes when viewed from the front.

For example, as described above, the first lighting unit 250 and the second lighting unit 260 are arranged at positions where the first rotating axis is tilted by any value of 0 degrees or more and 40 degrees or less. The first lighting unit 250 and the second lighting unit 260 may be arranged so as to satisfy either the example illustrated in FIG. 5 or the example illustrated in FIG. 6.

The above is the example of the configuration of the inspection apparatus 200.

The camera 300 is an imaging device that acquires image data by imaging the container 400. For example, the camera 300 is installed in advance at a predetermined position on the same side as the side where the first lighting unit 250 and the second lighting unit 260 are located as seen from the container 400 using a camera fixing means or the like, which is not shown. Specifically, for example, the camera 300 is installed so that the optical axis of the camera 300 overlaps the second rotation axis. In other words, for example, the camera 300 is installed so that the optical axis of the camera 300 passes through the center of the liquid 410. The installation position of the camera 300 may be other than the illustrated above.

For example, the camera 300 can acquire image data at a high frame rate of about 150 to 200 fps. Moreover, the camera 300 can transmit the acquired image data together with information indicating the imaging time and the like to an external device connected to the camera 300. The camera 300 may acquire image data at a frame rate other than illustrated above.

The container 400 is a light-transmitting container, such as a syringe, a glass bottle, and a plastic bottle. As described above, in a case where the viscosity of the liquid 410 filled inside is high, using a syringe as the container 400 is assumed. Moreover, the liquid 410 such as water or medicine is filled inside the container 400. There is a possibility that a scratch, dirt, or the like, is stuck to the container 400. Moreover, there is a possibility that a foreign object is contained in the container 400. A foreign object may include, for example, a rubber piece, hair, a fiber fragment, soot, and glass and plastic fragments.

The above is the example of the configuration of the inspection system 100. As described above, the image data acquired by the camera 300 included by the inspection system 100 can be used by, for example, an external determination device performing foreign object determination when performing determination of a foreign object. In this example embodiment, there is no specific limitation on an algorithm used when the determination device performs foreign object determination, and so forth.

Subsequently, with reference to FIG. 7, an example of operation of the inspection system 100 will be described. Referring to FIG. 7, the gripping device 210 grips a syringe, which is the container 400 (step S101).

The camera 300 starts acquiring image data in response to an imaging start instruction or the like (step S102). For example, the camera 300 can acquire image data at a high frame rate of about 150 to 200 fps.

The control device 240 rotates the container 400 around the second rotation axis (step S103). The angle of rotating the container 400 may be any angle.

Further, the control device 240 rotates the container 400 around the first rotation axis (step S104). The angle of rotating the container 400 may be any angle. The control device 240 may rotate the container 400 a plurality of times.

The control device 240 may perform the processes at step S103 and step S104 a plurality of times. In the respective processes, the angle of rotating the container 400 may vary.

After the rotation by the control device 240, for example, when a predetermined time elapses, the camera 300 finishes the acquisition of image data (step S105). The image data acquired by the camera 300 can be transmitted to a determination device performing foreign object determination, or the like.

Thus, the inspection apparatus 200 has the first lighting unit 250 and the second lighting unit 260 arranged on the same side as the side where the camera 300 is installed. According to such a configuration, the camera 300 can acquire light reflected by a foreign object or the like. As a result, it is possible to acquire more appropriate image data for detecting a foreign object. Consequently, an external device or the like can more appropriately detect a foreign object based on the image data.

Further, in the case of the inspection apparatus 200 in this example embodiment, the first lighting unit 250 and the second lighting unit 260 are arranged at positions where the first rotation axis is tilted by any angle of 0 degrees or more and 40 degrees or less. By thus arranging the first lighting unit 250 and the second lighting unit 260, it is possible to limit light reflected by the syringe, and the like. As a result, the increase in blind spots can be limited, and more appropriate image data can be acquired for detecting foreign objects.

Second Example Embodiment

Figure 8:
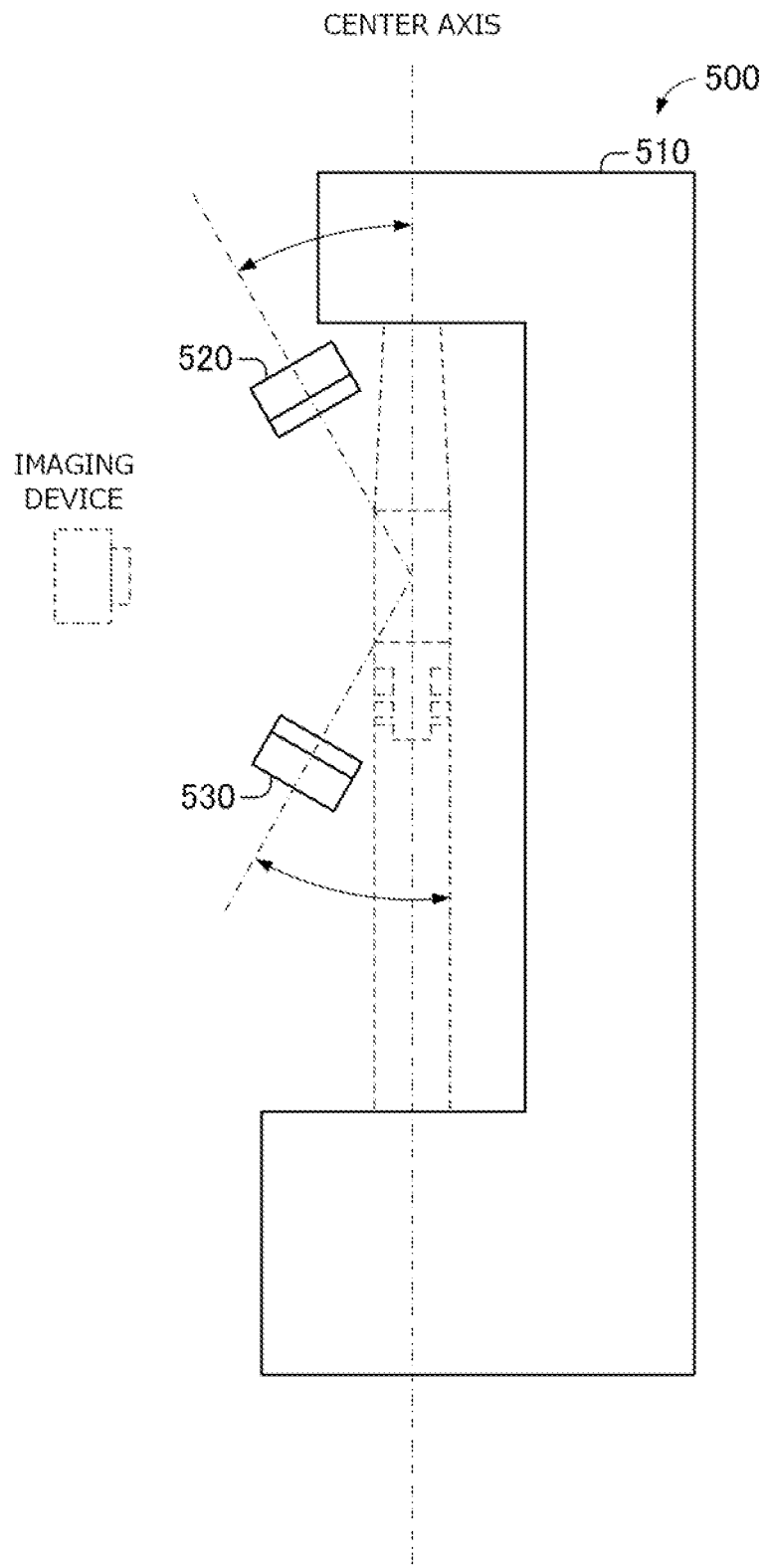
FIG. 8 is a view showing an example of a configuration of an inspection apparatus in a second example embodiment of the present disclosure.

Next, with reference to FIG. 8, a second example embodiment of the present invention will be described. In FIG. 8, the overview of a configuration of an inspection apparatus 500 will be described.

FIG. 8 shows an example of the configuration of the inspection apparatus 500. Referring to FIG. 8, the inspection apparatus 500 includes, for example, a gripping unit 510, a first lighting unit 520, and a second lighting unit 530.

The gripping unit 510 grips a container filled with a liquid. For example, the gripping unit 510 grips one longitudinal end and the other longitudinal end of the container such as a syringe.

The first lighting unit 520 emits light onto the liquid from the side of the one longitudinal end of the container. The second lighting unit 530 emits light onto the liquid from the side of the other longitudinal end of the container.

Referring to FIG. 8, the first lighting unit 520 and the second lighting unit 530 are arranged on the same side as an imaging device that acquires image data representing the state of the liquid as seen from the container. Moreover, the first lighting unit 520 and the second lighting unit 530 are arranged so as to emit light onto the liquid from positions where a center axis passing through the center of the container is tilted by any angle of 0 degrees or more and 40 degrees or less.

Thus, the inspection apparatus 500 has the first lighting unit 520 and the second lighting unit 530 arranged on the same side as the side where the imaging device is installed. According to such a configuration, the imaging device can acquire light reflected by a foreign object or the like. As a result, it is possible to acquire more appropriate image data for detecting a foreign object. Consequently, an external device or the like can more appropriately detect a foreign object based on the image data.

Further, an inspection method executed by the inspection apparatus 500 described above includes, by the inspection apparatus 500: emitting light onto a liquid from a position on a same side as an imaging device acquiring image data representing a state of the liquid as seen from a container filled with the liquid, which is a position where a center axis passing through a center of the container is tilted by any angle of 0 degrees or more and 40 degrees or less; and acquiring the image data representing the aspect of the liquid onto which the light is being emitted.

The invention of the inspection method having the abovementioned configuration also has the same actions and effects as described before, so that it can achieve the abovementioned object of the present invention.

SUPPLEMENTARY NOTES

The whole or part of the example embodiments disclosed above can be described as the following supplementary notes. Below, the overview of an inspection apparatus and so forth according to the present invention will be described. However, the present invention is not limited to the following configurations Supplementary Note 1

An inspection apparatus comprising:
a gripping unit that grips a container filled with a liquid;
a first lighting unit that emits light onto the liquid from one longitudinal end side of the container; and
a second lighting unit that emits light onto the liquid from an other longitudinal end side of the container, wherein
the first lighting unit and the second lighting unit are arranged on a same side as an imaging device that acquires image data showing a state of the liquid as seen from the container, and are each installed so as to emit light onto the liquid from a position where a center axis passing through a center of the container is tilted by any angle of 0 degrees or more and 40 degrees or less.

Supplementary Note 2

The inspection apparatus according to Supplementary Note 1, wherein
the first lighting unit and the second lighting unit are each installed so as to emit light onto the liquid from a position where the center axis is tilted by any angle of 10 degrees or more and 30 degrees or less in a horizontal direction.

Supplementary Note 3

The inspection apparatus according to Supplementary Note 1 or 2, wherein
the first lighting unit and the second lighting unit are each installed so as to emit light onto the liquid from a position where the center axis is tilted by any angle of 0 degrees or more and 40 degrees or less in a perpendicular direction that is orthogonal to the center axis.

Supplementary Note 4

The inspection apparatus according to any of Supplementary Notes 1 to 3, wherein
the first lighting unit and the second lighting unit are each installed so as to emit light onto the liquid from a position where the center axis is tilted by any angle of 10 degrees or more and 30 degrees or less in a perpendicular direction that is orthogonal to the center axis.

Supplementary Note 5

The inspection apparatus according to any of Supplementary Notes 1 to 4, wherein
the first lighting unit is installed so as to emit light onto the liquid from above the center axis, and the second lighting unit is installed so as to emit light onto the liquid from below the center axis.

Supplementary Note 6

The inspection apparatus according to any of Supplementary Notes 1 to 5, wherein:
the gripping unit grips the container so as to be able to rotate around the center axis, and also grips the container so as to be able to rotate around an orthogonal axis that is orthogonal to the center axis; and
the first lighting unit and the second lighting unit are arranged symmetrically as seen from the orthogonal axis.

Supplementary Note 7

The inspection apparatus according to any of Supplementary Notes 1 to 6, wherein
the gripping unit grips the container so as to be able to rotate around the center axis, and also grips the container so as to be able to rotate around an orthogonal axis that is orthogonal to the center axis,
the inspection apparatus comprising a control device that controls rotation of the container, wherein
the control device rotates the container around the orthogonal axis and thereafter rotates the container around the center axis.

Supplementary Note 8

The inspection apparatus according to any of Supplementary Notes 1 to 7, wherein
the gripping unit grips the container so as to be able to rotate around the center axis, and also grips the container so as to be able to rotate around an orthogonal axis that is orthogonal to the center axis,
the inspection apparatus comprising a control device that controls rotation of the container, wherein
the control device is configured to perform rotation control differently depending on viscosity of the liquid.

Supplementary Note 9

The inspection apparatus according to Supplementary Note 8, wherein
the control device performs either rotation control to rotate the container around the orthogonal axis and thereafter rotate the container around the center axis, or rotation control to rotate the container around the center axis and thereafter rotate the container around the orthogonal axis.

Supplementary Note 10

An inspection method by an inspection apparatus, the inspection method comprising:

from a position which is, as seen from a container filled with a liquid, on a same side as an imaging device that acquires image data showing a state of the liquid and in which a center axis passing through a center of the container is tilted by any angle of 0 degrees or more and 40 degrees or less, emitting light onto the liquid; and acquiring image data showing a state of the liquid during light emission.

Although the present invention has been described above with reference to the example embodiments, the present invention is not limited to the example embodiments. The configurations and details of the present invention can be changed in various manners that can be understood by one skilled in the art within the scope of the present invention.

REFERENCE SIGNS LIST 100 inspection system
200 inspection apparatus
210 gripping device
211 first gripping part
212 second gripping part
220 first motor
230 second motor
240 control device
250 first lighting unit
260 second lighting unit
300 camera
400 container
410 liquid
500 inspection apparatus
510 gripping unit
520 first lighting unit
530 second lighting unit

What is claimed is:

1. An inspection apparatus comprising:
a gripping unit that grips a container filled with a liquid;
a first lighting unit that emits light onto the liquid from one longitudinal end side of the container; and
a second lighting unit that emits light onto the liquid from an other longitudinal end side of the container, wherein
the first lighting unit and the second lighting unit are arranged on a same side as an imaging device that acquires image data showing a state of the liquid as seen from the container, and are each installed so as to emit light onto the liquid from a position where a center axis that is a longitudinal axis of the container is tilted by an angle of 0 degrees or more and 40 degrees or less, and
the first lighting unit is installed so as to emit light onto the liquid from above the center axis and the second lighting unit is installed so as to emit light onto the liquid from below the center axis such that the first lighting unit and the second lighting unit have a symmetric positional relationship about a point through which an orthogonal axis passes, the orthogonal axis being orthogonal to the center axis.

2. The inspection apparatus according to claim 1, wherein the first lighting unit and the second lighting unit are each installed so as to emit light onto the liquid from a position where the center axis is tilted by any angle of 10 degrees or more and 30 degrees or less in a horizontal direction.

3. The inspection apparatus according to claim 1, wherein the first lighting unit and the second lighting unit are each installed so as to emit light onto the liquid from a position where the center axis is tilted by any angle of 0 degrees or more and 40 degrees or less in a perpendicular direction that is orthogonal to the center axis.

4. The inspection apparatus according to claim 1, wherein the first lighting unit and the second lighting unit are each installed so as to emit light onto the liquid from a position where the center axis is tilted by any angle of 10 degrees or more and 30 degrees or less in a perpendicular direction that is orthogonal to the center axis.

5. The inspection apparatus according to claim 1, wherein the gripping unit grips the container so as to be able to rotate around the center axis, and also grips the container so as to be able to rotate around the orthogonal axis that is orthogonal to the center axis.

6. The inspection apparatus according to claim 1, wherein the gripping unit grips the container so as to be able to rotate around the center axis, and also grips the container so as to be able to rotate around the orthogonal axis that is orthogonal to the center axis,
the inspection apparatus comprises a control device that controls rotation of the container,
the control device rotates the container around the orthogonal axis and thereafter rotates the container around the center axis, and
in a case that viscosity of the liquid is higher than a predetermined value, the control device rotates the container around the center axis and thereafter rotates the container around the orthogonal axis.

7. The inspection apparatus according to claim 1, wherein the gripping unit grips the container so as to be able to rotate around the center axis, and also grips the container so as to be able to rotate around the orthogonal axis that is orthogonal to the center axis,
the inspection apparatus comprises a control device that controls rotation of the container, wherein
the control device is configured to perform rotation control differently depending on viscosity of the liquid.

8. The inspection apparatus according to claim 7, wherein the control device performs either rotation control to rotate the container around the orthogonal axis and thereafter rotate the container around the center axis, or rotation control to rotate the container around the center axis and thereafter rotate the container around the orthogonal axis.

9. An inspection method by an inspection apparatus, the inspection method comprising:
from a position which is, as seen from a container filled with a liquid, on a same side as an imaging device that acquires image data showing a state of the liquid and in which a center axis that is a longitudinal axis of the container is tilted by any angle of 0 degrees or more and 40 degrees or less, emitting light onto the liquid; and
acquiring image data showing a state of the liquid during light emission,
wherein the emitting light onto the liquid further comprises:
emitting light onto the liquid from a first position that is above the center axis and from a second position that is below the center axis, the first position and the second position having a symmetric positional relationship about a point through which an orthogonal axis passes, the orthogonal axis being orthogonal to the center axis.

* * * * *